Feb. 25, 1941.   E. C. LADD ET AL   2,232,791
CEMENT
Filed July 1, 1937
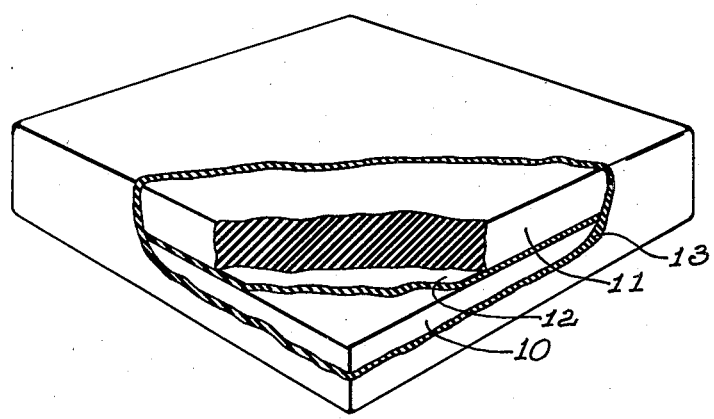
INVENTOR
ELBERT C. LADD AND
BY   NICHOLAS J. RAKAS.
ATTORNEYS Patented Feb. 25, 1941

2,232,791

UNITED STATES PATENT OFFICE 2,232,791

CEMENT

Elbert C. Ladd, Highland Park, and Nicholas J. Rakas, Royal Oak, Mich., assignors to Chrysler Corporation, Highland Park, Mich., a corporation of Delaware Application July 1, 1937, Serial No. 151,336

4 Claims. (Cl. 260—768)

This invention relates to improved rubber conversion products, to the process of making the same, and to an improved agent for bringing about such conversion of rubber.

More particularly, the invention pertains to rubber conversion products of the type which are suitable for use in cement, fabrics, fibers and other water-proofing propositions, and coatings, and in rubber compounds for general application.

One of the main objects of the invention is to provide an improved cement for securing together parts comprising rubber, resins, metal, concrete, fibrous material, and the like.

Another object of the invention is to provide improved cement of this character which is particularly adapted to secure rubber, or rubber containing compounds, directly to metals including ferrous metals, aluminum, chromium, tin and brass, during vulcanization of such compounds while in intimate contact therewith.

Further objects of the invention are the provision of a cement of this character by which vulcanized rubber and rubber containing compounds can be tenaciously secured to metal, fabrics, fibrous materials, resins, concrete and other rigid surfaces; to provide a cement of this kind which may be air set at atmospheric temperature or set under the influence of heat.

Still further objects of the invention are the provision of an improved coating composition for articles comprising any of the foregoing materials; to provide a coating composition of this kind which, when set, presents a smooth lasting finish; to provide a coating of this character suitable for undercoat purposes and to which the conventional surface coating material such as paints, varnish, and the like readily bond; to provide a coating composition of this kind which, when set, has a relatively hard exterior and a slightly yieldable, generally flexible, understructure.

Another object of the invention is the provision of an improved agent and method for rendering the molecules of rubber chemically more saturated.

A further object of the invention is the provision of a cement of the foregoing character with which may be compounded any of the usual rubber compounding ingredients such as sulphur, vulcanizing agents, accelerators, loading pigments and loading fillers.

An illustrative embodiment of the invention is shown in the accompanying drawing, in which:

The figure is a perspective illustrative view of a pair of articles cemented together and coated in accordance with the invention.

One article comprising metal designated by the numeral 10 and the other including rubber and designated 11 are secured together by cement 12 embodying the invention and having an exterior coating 13 comprising such material.

While it cannot be stated with certainty at this time exactly what reaction takes place during the reaction of the material from which the improved cement coating material is formed, it is believed that during the reaction of the following materials, the molecules of rubber are so varied in their bond structure as to become chemically more saturated. Repeated tests and experiments have, however, clearly revealed that the resulting final product produces bond between rubber and metal, including ferrous metal, of improved characteristics and having tensile strength as high as 800 pounds per square inch. The materials used in the manufacture of coatings embodying the invention may be varied throughout substantially wide ranges in proportion, the following being an illustrative example.

A solution of crepe rubber, having 20% by weight of rubber dissolved in a suitable rubber solvent, is treated with a perchloric acid solution, these being present preferably substantially one part by weight of perchloric acid to substantially six parts by weight of rubber in solution. These materials are reacted together for a period of from two to three hours and at a temperature of from substantially 120° F. to substantially 150° F. After the reaction had completed or proceeded to a desired extent, the reaction products are precipitated by adding thereto a suitable precipitating agent. Alcohol alone may be used for this purpose and in this case a solution of alcohol and water comprising 75% alcohol and 25% water is preferably employed. It is advantageous to use a basic precipitating agent such as alcoholic potassium hydroxide or alcoholic sodium hydroxide, sufficient alkali being present to neutralize the acid.

After the precipitating operation, the liquid is separated from the reaction products by decanting, or by other suitable means, and the solid precipitate may then be dried by exposure to air or by the application of moderate heat. After the precipitate has been dried it may then be dissolved in any suitable rubber solvent, such for example as benzene.

The solution of precipitated reaction product may be concentrated to any desired viscosity, depending upon the use for which the material is intended. A solution comprising 20% of the precipitated reaction product by weight in benzene is particularly suitable for cement purposes.

The crepe rubber may be dissolved in any rubber solvent such as toluene, benzene, xylene or trichlorethylene. Carbontetrachloride and trichlorethylene are particularly advantageous inasmuch as they are non-inflammable. The completion of the reaction between the perchloric acid and rubber is well indicated by the viscosity of the solution which initially increases and then decreases. As the reaction reaches completion, the viscosity of the reacted materials decreases below the original viscosity of the rubber solution.

Cements and coating materials made in accordance with the foregoing method will air set to a desired extent under atmospheric conditions, or the setting thereof may be accelerated by the application of moderate heat. Temperatures ranging from 200° F. to 300° F. may be employed in the setting operations.

An important application of cement embodying the invention is the use thereof to secure rubber containing articles directly to metals such as ferrous metals and aluminum during vulcanization of the rubber content of one or more of the parts of the assembly. This may be accomplished by applying a relatively thin film of the cement to the metal surface or the surface of the rubber containing part in which the rubber is in an unvulcanized state. The parts are then secured together and held under pressure during a conventional vulcanizing operation. When this procedure is followed a substantially integral bond is formed between the metal and rubber containing parts.

Cement made in accordance with the foregoing method may be modified and conditioned for specific application by adding thereto conventional rubber compounding ingredients of which the following are two examples.

| | |
|---|---|
| Rubber conversion product (as produced by foregoing procedure) ___parts by weight__ | 10.0 |
| m-Dinitrobenzene _____do____ | 0.3 |
| Gas black_____do____ | 1.0 |
| Litharge_____do____ | 0.95 |
| Solvent (benzene) _____cc___ | 100 |

| | |
|---|---|
| Rubber conversion product (as produced by foregoing procedure) ___parts by weight__ | 10.0 |
| Trinitrobenzene _____do____ | 0.3 |
| Gas black_____do____ | 1.0 |
| Litharge_____do____ | 0.95 |
| Solvent (benzene) _____cc___ | 100 |

The solid materials of the above compounding composition may be milled or otherwise incorporated with the precipitated reaction product resulting from the reaction of a solution of rubber and perchloric acid. Then the liquid or solvent ingredients thereof may be added.

If desired, the compounding compositions above set forth may be produced in solution form and directly added and mixing by stirring with a solution of the precipitated reaction product.

Products resulting from the reaction of perchloric acid upon rubber, preferably in an unvulcanized state, and in solution have been found to possess superior cement qualities and they are capable of successful applications without the requirement of extreme scientific technique. Cements made in accordance with the invention may therefore be successfully used by those having no more skill than the average workman in the art. Results have been found to be uniform and the cement and coating material is not sensitive to slight deviations from the preferred practice of application. When compositions embodying the invention are employed as coatings for diverse surfaces of solid material, the solution of the precipitated reaction product is brought to desired viscosity and applied in a relatively thin film. The film may be air set or set by heating the article together with the film in an oven of the type conventionally used in drying surface coating material. Surface coatings formed from precipitated reaction products made in accordance with this invention may be used to advantage as undercoating compositions of conventional types such as enamel, lacquer, varnishes and the like. The exterior of coatings formed in accordance with the invention is smooth, glossy and comparatively hard while the underlying portions of the coating are slightly yieldable and sufficiently plastic to withstand chipping.

Although but several specific embodiments of the invention are herein set forth, it will be understood that various changes in the size, shape and arrangement of parts may be made without departing from the spirit of our invention.

We claim:

1. A rubber conversion product insoluble in alcohol comprising the reaction products of a solution of rubber and perchloric acid.

2. A rubber conversion product comprising alcoholic-alkali precipitated reaction products of rubber and perchloric acid.

3. The method of making rubber cement which comprises dissolving unvulcanized rubber in a rubber solvent, reacting said solution with perchloric acid, freeing the resulting reaction products from perchloric acid, and dissolving the resulting perchloric acid free product in a solvent.

4. The method of making rubber cement which comprises dissolving unvulcanized rubber in a rubber solvent, reacting said solution with perchloric acid, precipitating the reaction products in alcohol, dissolving said precipitate in a rubber solvent.

ELBERT C. LADD.
NICHOLAS J. RAKAS.